Nov. 26, 1963 A. B. MARMO 3,111,960

THREE WAY VALVE

Filed Nov. 1, 1960 2 Sheets-Sheet 1

INVENTOR
ANTHONY B. MARMO

BY *Roy E. Raney*

ATTORNEY

Nov. 26, 1963  A. B. MARMO  3,111,960

THREE WAY VALVE

Filed Nov. 1, 1960  2 Sheets-Sheet 2

INVENTOR
ANTHONY B. MARMO
BY *Tony E. Raney*
ATTORNEY

United States Patent Office 3,111,960
Patented Nov. 26, 1963

3,111,960
THREE WAY VALVE
Anthony B. Marmo, Pompano Beach, Fla., assignor to Ranco Incorporated, Columbus, Ohio, a corporation of Ohio
Filed Nov. 1, 1960, Ser. No. 66,522
2 Claims. (Cl. 137—315)

This invention relates to improvements in three-way valves and more particularly to an improved three way valve having an inlet to receive fluid from the pressure side of a system and a pair of alternate outlets for directing fluid into one path or another.

It is a primary object of this invention to provide a three-way control valve of the above mentioned character, preferably solenoid actuated, the parts of which can be readily assembled and disassembled for inspection and replacement without removing the valve body from its connections with the system, and which assembly and disassembly can be carried out with a minimum of tools and a maximum of convenience.

A more specific object of the present invention is the provision of a valve including a body having a chamber with two opposed outlet ports, and a disc-like valve member disposed therebetween for movement between positions for selectively closing alternate ports, one of which is formed in a hollow valve guide member which projects into the chamber from one side wall thereof thereby providing space between the guide member and the opposite side wall of the chamber for removal of the valve member. Preferably, the valve has a stem normally held in guided relation with the guide member by fluid entering the chamber.

Another object of the invention is the provision of an improved solenoid actuated valve having two outlet ports of different sizes adapted to be alternatively closed by a valve member connected to a diaphragm which is acted upon by fluid pressure for moving the valve member in one direction for closing the smaller port, and the outlet ports being so arranged that fluid pressure in the valve is effective to move the valve member in the opposite direction for closing the larger port.

Other objects and advantages of this invention will become apparent from the following description of a preferred form thereof and from the accompanying sheets of drawings forming a part of this specification, and in which.

Figure 1:
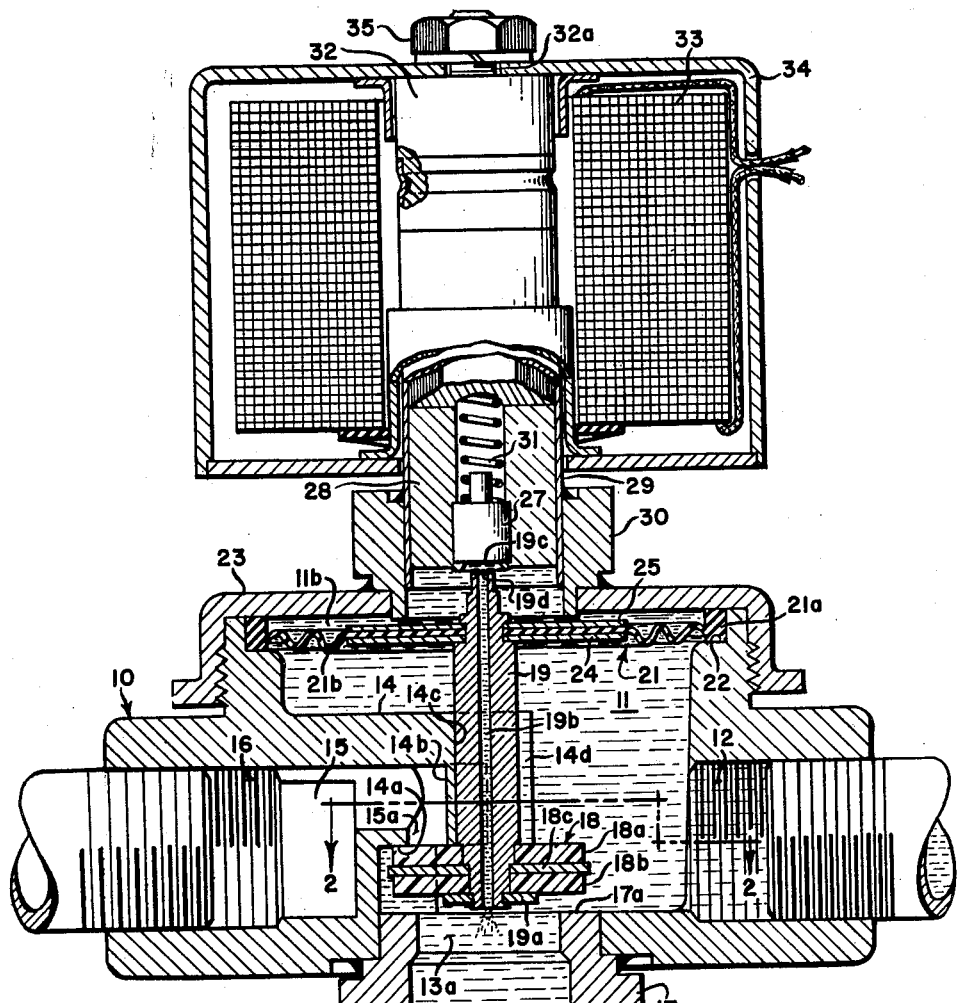
FIG. 1 is a sectional view of a three-way control valve embodying this invention.
Figure 2:
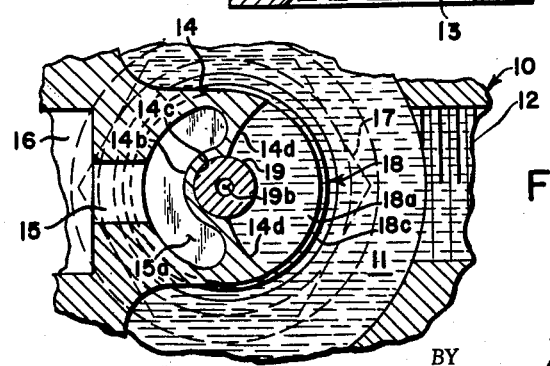
FIG. 2 is a fragmentary sectional view of a portion of the valve shown in FIG. 1, taken along line 2—2 thereof.

Although the invention is susceptible of practice in other forms and applications, the preferred form comprises a solenoid actuated three-way valve for connection in a system for heating or cooling the air in a room, the valve being adapted to be connected to pass fluid from a pressure source through a heat exchanger, to either radiate or absorb heat as called for by a room thermostat, and to by-pass the fluid around the heat exchanger when a temperature change is not called for by the thermostat.

In the form of valve shown, there is provided a valve body 10 having a generally circular chamber 11 including an inlet 12, opening into one side thereof, and a centrally located outlet 13. A projection 14 extends into chamber 11 from the side thereof opposite inlet 12, and has an L-shaped passage 15 therein leading from the chamber 11 to a second outlet 16. Passage 15 is crescent-shaped in section where it opens into chamber 11, and the surface of projection 14 surrounding that opening provides a valve seat 14a around a crescent-shaped port 15a.

Outlet 13 is preferably in the form of a bore in a member 17 secured in an opening in the side of the body 10 by brazing or soldering, as shown, and the inner end surface thereof serves as a valve seat 17a surrounding an outlet port 13a opposite the outlet port 15a in projection 14. A disc-like valve member 18 is disposed between spaced seats 14a and 17a and is movable therebetween to control the flow of fluid through the outlet ports to a suitable heat exchanger or back to the low side of the heating or cooling system. Valve member 18 comprises washers 18a and 18b, of a somewhat resilient material such as "Teflon" (tetraethylfluorine) or the like, spaced by a metal backing washer 18c and secured to a valve stem 19 between a shoulder thereof and a washer member 19a held by the upset end of the stem 19. The projection 14 comprises an arcuate wall 14b on one side of which is passage 15, and the other side of which defines a groove 14c in which stem 19 is adapted to be guided. The projection 14 thereby serves as a guide for the stem 19 during movement of valve member 18 and the projection will hereafter be referred to as a guide member.

The stem 19 is connected to a flexible diaphragm 21 to effect movements of valve 18 in accordance with pressure differentials on opposite sides of the diaphragm, the rim 21a of which is clamped between a shoulder 22 of the valve body 10 and a cap 23 which is threadedly engaged with the body 10. A pair of backing discs 24 and 25 are disposed on opposite sides of the diaphragm 21 and are clamped thereto against a shoulder of the stem 19 by a ridge 19a thereof to make a fluid tight connection between the stem and diaphragm.

The diaphragm 21 is provided with a bleed opening 21b which permits fluid under pressure in the chamber 11 to bleed into a space 11b on the opposite side of the diaphragm. The stem 19 is provided with a bore 19b of larger cross-sectional area than bleed opening 21b and adapted to convey fluid from the space 11b to the outlet port 13a at a greater rate than the fluid can bleed into the space 11b through the opening 21b. The end surface of stem 19 extending into space 11b provides a seat 19c surrounding a port 19d, which port is adapted to be closed by a rubber-like pilot valve 27 to control fluid flow from space 11b through bore 19b and will hereafter be referred to as a pilot port.

The pilot valve 27 is secured in a bore in a solenoid armature 28 which is reciprocable in a sleeve 29. Sleeve 29 is mounted on cap 23 as by being brazed to a bushing 30 which is in turn brazed to the cap 23. Armature 28 and pilot valve 27 are normally urged toward pilot port 19d by a compression spring 31 which reacts against a plug 32 secured in the upper end of sleeve 29 as by brazing or welding. A solenoid coil 33 is disposed about the sleeve 29 and is supported within a housing 34 which provides a path for magnetic flux for retraction of armature 28, and which housing is secured to the plug 32 by a nut 35 on a screw 32a extending from the plug.

The present invention is particularly directed to the construction and arrangement of parts whereby the valve member 18 is adapted to control the two outlet ports 13a and 15a, and whereby the valve member 18, stem 19 and diaphragm 21 are readily removable from one side of the valve for inspection and replacement of parts without removing the valve body from the system in which it is installed. Because the port 15a is crescent shaped and of less cross-sectional area than the port 13a, it can be located substantially to one side of the chamber 11. Likewise, the guide member 14, in which the port 15a is formed need only extend partially across the chamber 11, thereby providing the open sided guide surface or groove 14c opposite the inlet 12. The stem 19 can therefore be moved laterally into and out of its normal position in the groove 14c formed by the wall 14b for removal, but is normally held in the groove by the geometric symmetry of the assembly, and by the tendency of diaphragm 21 and valve seat 18 to maintain this symmetry as they respond to the fluid pressures and the flow direction.

Figure 4:
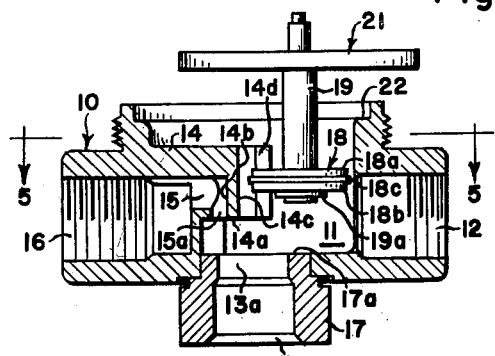
FIG. 4 is a sectional view of the body of the valve reduced in scale and showing some parts partially assembled therewith.
Figure 5:
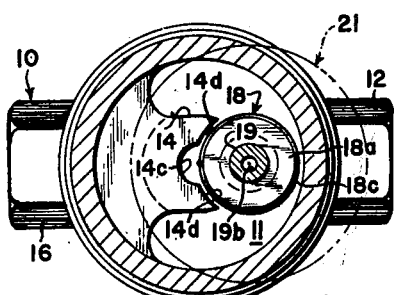
FIG. 5 is a sectional view taken along line 5—5 of FIG. 4.
Figure 6:
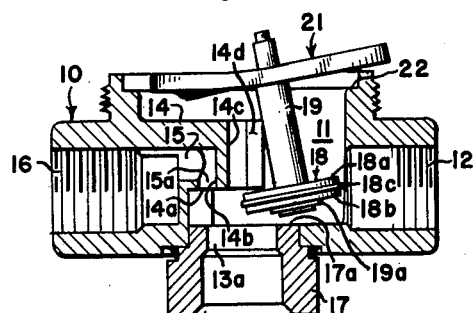
FIG. 6 is a view similar to FIG. 4 and further illustrating the mode of assembling certain parts.
Figure 7:
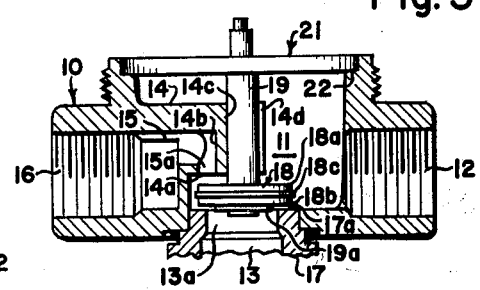
FIG. 7 is a view similar to FIG. 4 showing the parts in assembled position.

Wall portions 14d of projecting guide member 14 are arcuate in shape to provide a generally circular clearance between the guide member and the opposite wall of chamber 11 for removal or assembly of the valve member 18, as shown in FIGS. 4 and 5. As is illustrated in FIG. 6, the diaphragm 21 may be distorted to rock the backing discs 24, 25, the valve member 18, and stem 19 to facilitate removal of or insertion of these parts. Thus, by placing the smaller port 15a to one side of the chamber, and by leaving the other side of the chamber free of guide means for the valve stem, the assembly and disassembly of the valve is greatly simplified and permits the valve to be taken down completely from one side thereof after simply removing the cap 23 and without necessitating the disconnection of the inlet and outlets from a system in which the valve is connected.

The valve is illustrated in FIG. 1 with the solenoid 33 energized, armature 28 raised, and pilot valve 27 retracted from seat 19c leaving pilot port 19d open. In this condition pressure fluid is passed by pilot port 19d out of space 11b through passage 19b to the outlet 13, which is on the low pressure side of the system, faster than fluid can bleed through port or opening 21b. A pressure differential is thereby created between opposite sides of diaphragm 21 tending to move it in a direction holding valve member 18 on seat 14a to maintain the port 15a closed and port 13a open. The heating or cooling fluid flowing through inlet 12 is thereby passed through chamber 11 and out outlet 13, through the heat exchanger.

Figure 3:
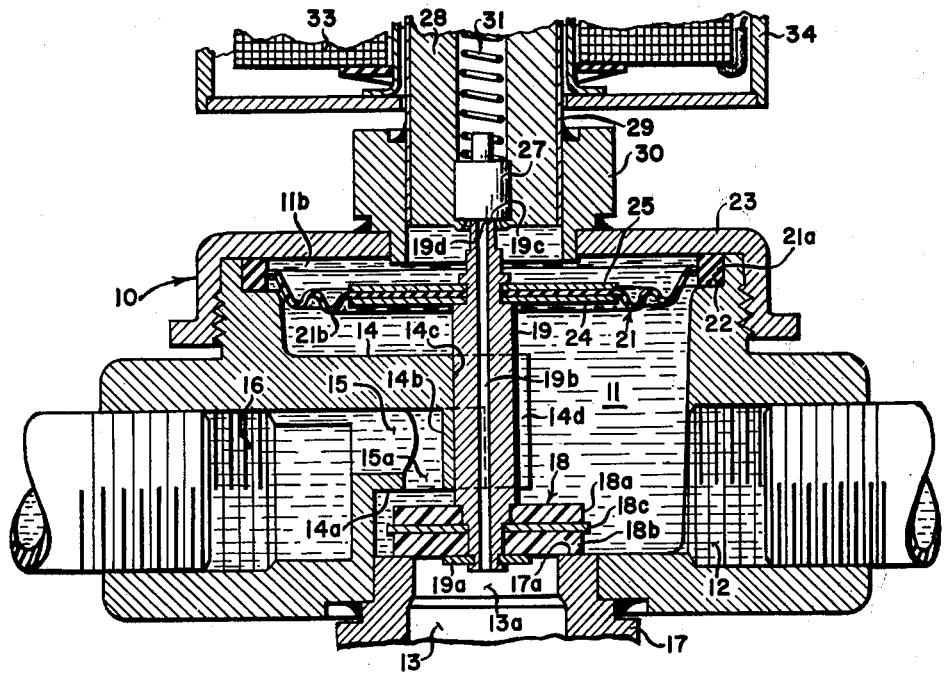
FIG. 3 is a sectional view similar to FIG. 1 but showing certain parts in different positions.

When solenoid 33 is deenergized, releasing the armature 28, pilot valve 27 is permitted to close pilot port 19d under the influence of spring 31, thereby preventing pressure fluid from leaving space 11b and permitting pressure fluid which bleeds through opening 21b into space 11b to equalize the pressures on opposite sides of the diaphragm. Because the area of port 15a is considerably smaller than the area of port 13a, as has been mentioned previously, and because the outlet ports are on the low pressure side of the system, there will be a net downward force on the valve member 18 causing it to move away from seat 14a toward seat 17a, and then to seal tightly against seat 17a to close port 13a and open port 15a as is illustrated in FIG. 3, by-passing the heat exchanger.

It will be recognized that subsequent reenergization of solenoid 33 will raise pilot valve 27 from pilot port 19d causing a reduction in pressure in space 11b and a consequent return of valve member 18 to the position illustrated in FIG. 1.

It will also be recognized that by providing outlet ports of different sizes and arranged in the manner described above with the valve member 18 acting therebetween, the invention has taken advantage of the differences in port sizes to utilize the fluid pressure in actuation of the valve, and that further advantage of the different sizes of the valve ports is taken to provide clearance in chamber 11 for removal of the valve member 18 from the body of the valve without removing the latter from its connection with the system in which it is installed.

From the foregoing detailed description of a three-way valve embodying this invention and from the accompanying sheets of drawings, it will be appreciated that there has been provided by the invention an improved valve which, by its novel construction and arrangement of parts, has provided for reliability in operation and ease in assembly and maintenance.

Although the invention has been described with reference to a specific valve embodying the invention, and with reference to a specific use, it will be understood that the invention is not limited thereby, but rather the invention includes all those modifications, adaptations and uses as reasonably fall within the scope of the claims hereof.

Having described my invention, I claim:

1. A control valve of the character described having a body defining a chamber having an inlet in one wall thereof, a first outlet port in an adjacent wall of said chamber, a capped opening in said housing opposite said adjacent wall, a hollow valve guide member extending into said chamber and having defined therein a second outlet port opposite said first outlet port, a valve member comprising a disc portion mounted on a valve stem, said disc portion being disposed between said outlet ports and movable therebetween by longitudinal movement of said stem for selectively controlling the flow of fluid therethrough, said guide member being spaced from said one wall and presenting a concave guide surface to receive said valve stem for longitudinal movement of said stem therein, said concave guide surface facing away from said second outlet port and disposed between said valve stem and said second outlet port, said second outlet port being off center with respect to said valve member and valve stem whereby fluid flow in said chamber to said second port acts on said valve member to hold said stem in guided relation with said guide surface, and said disc portion of said valve member being of a size to permit movement thereof between said guide surface member and said one wall, said valve member and said opening being so related in size as to permit removal of the valve member from said valve body.

2. A control valve as defined in claim 1 and wherein said valve stem is disposed between said concave guide surface and said inlet, whereby fluid entering said chamber impinges against and urges said stem against said guide surface.

References Cited in the file of this patent

UNITED STATES PATENTS

| | | |
|---|---|---|
| 1,665,443 | Cannon | Apr. 10, 1928 |
| 2,433,414 | Annin | Dec. 30, 1947 |